United States Patent [19]

Komiya et al.

[11] Patent Number: 4,908,055
[45] Date of Patent: Mar. 13, 1990

[54] METHOD OF MANUFACTURING THEREOF FLUORESCENT LAMP

[75] Inventors: Akitoshi Komiya; Taketo Kamei, both of Kanagawa, Japan

[73] Assignee: Kabushiki Kaisha Toshiba, Kawasaki, Japan

[21] Appl. No.: 298,093

[22] Filed: Jan. 18, 1989

[30] Foreign Application Priority Data

Oct. 31, 1983 [JP] Japan .............................. 58-203802

Related U.S. Application Data

[63] Continuation-in-part of Ser. No. 104,557, Sep. 29, 1987, abandoned, which is a continuation of Ser. No. 858,853, Apr. 30, 1986, abandoned, which is a continuation of Ser. No. 666,927, Oct. 31, 1984, abandoned.

[51] Int. Cl.$^4$ .......................... H01J 9/26; C03B 33/06
[52] U.S. Cl. .......................................... 65/77; 65/110; 445/26
[58] Field of Search ...................... 65/77, 79, 103, 108, 65/109, 110; 455/22, 26

[56] References Cited

U.S. PATENT DOCUMENTS

| | | | |
|---|---|---|---|
| 1,963,961 | 6/1934 | Barclay | 445/26 |
| 2,491,848 | 12/1949 | Breadner | 65/110 |
| 2,862,337 | 12/1958 | Shaw et al. | 65/108 X |
| 3,905,795 | 9/1975 | Finch et al. | 65/109 X |
| 3,966,288 | 6/1976 | Finch et al. | 445/26 |
| 4,196,374 | 4/1980 | Witting | 445/26 X |
| 4,283,217 | 8/1981 | Kawamura | 65/108 |
| 4,319,906 | 3/1982 | Fix et al. | 65/108 X |

FOREIGN PATENT DOCUMENTS

| | | | |
|---|---|---|---|
| 58-14446 | 1/1983 | Japan | 445/26 |
| 58-14447 | 1/1983 | Japan | 445/26 |
| 134111 | 12/1971 | Netherlands . | |

Primary Examiner—Robert L. Lindsay
Attorney, Agent, or Firm—Cushman, Darby & Cushman

[57] ABSTRACT

A manufacturing method of a fluorescent lamp having a bent discharge path, which comprises the steps of press-molding a straight glass tube, after heating and softening it, into a bulb having a bent discharge path, while blowing a pressurized gas into the discharge path. A fluorescent lamp having a U-shaped discharge path which is integrally connected through a narrow plate. A slit is formed at least in a portion of the narrow plate adjacent to a sealing portion.

6 Claims, 5 Drawing Sheets

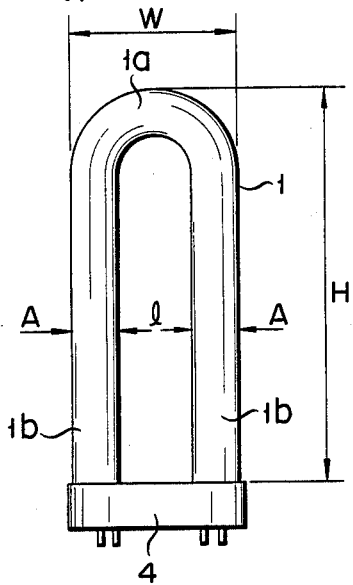
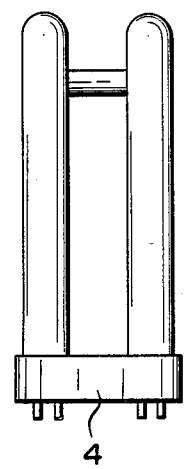
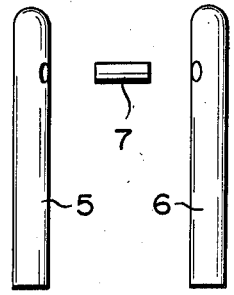
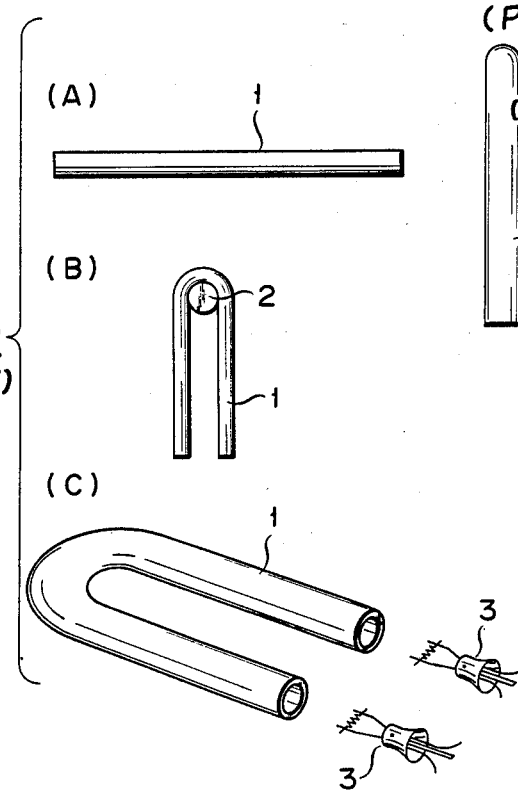
FIG. 1 (PRIOR ART)
FIG. 3 (PRIOR ART)
FIG. 4 (PRIOR ART)
FIG. 2 (PRIOR ART)

METHOD OF MANUFACTURING THEREOF FLUORESCENT LAMP

BACKGROUND OF THE INVENTION

This application is a continuation-in-part of application Ser. No. 07/104,557, filed Sept. 29, 1987 which is a continuation of Ser. No. 858,853, filed Apr. 30, 1985 which is a continuation of Ser. No. 666,927, filed Oct. 31, 1984, all abandoned.

1. Field of the Invention

The present invention relates to a fluorescent lamp which has a bent discharging path such as a U-shaped or variously shaped discharging path and a manufacturing method thereof.

2. Description of the Prior Art

With a view to saving electric power and thus meeting demands for energy saving, fluorescent lamps having good light-emitting efficacy recently tend to be used instead of incandescent lamps. When fluorescent lamps are used as alternatives to incandescent lamps, such lamps are preferably designed to be compact, thereby improving light efficacy. For this reason, U-shaped, H-shaped, and double U-shaped fluorescent lamps have been developed in place of straight fluorescent lamps.

The U-shaped fluorescent lamp shown in FIG. 1 is conventionally manufactured in the following manner. As shown in FIG. 2(A), a straight soft glass tube 1 is cut to a predetermined length and is washed. Thereafter, a fluorescent layer (not shown) is formed on an inner surface of the glass tube 1. The glass tube 1 is heated and softened and is wound around a forming roller 2, thereby forming a U-shaped bulb, as shown in FIG. 2(B). Mounts 3 are attached to two openings of the U-shaped bulb, thereby sealing it. Note that sealing of the mounts 3 can be performed after the bending or forming process of the glass tube 1. In FIG. 1, reference numeral 4 denotes a base.

According to this manufacturing method, since the straight glass tube is bent by softening and heating, a portion at an outer side of a bent portion 1a of the glass tube is undesirably expanded and therefore becomes thinner than an inner side. In addition, a uniform curvature cannot be obtained. On the other hand, when the glass tube is bent, two ends thereof are clamped by a chuck and the tube is wound around the forming roller 2. Therefore, since the roller 2 and the chuck occupy space between the straight portions 1b of the glass tube 1 which is formed into a U-shape, a gap l must be maintained. In addition to this, since the straight portions 1b are separated by the gap l, the mechanical strength of the glass tube 1 is lowered. Therefore, when an external force is applied along a direction indicated by an arrow A, the bent portion 1a can be easily broken. Furthermore, a bending apparatus having the chuck and the forming roller 2 has a complex structure, resulting in high equipment cost. The bending process requires many procedures such as clamping the glass tube 1 with the chuck, bending, releasing the glass tube 1 from the chuck, removing the roller, and the like, and does not therefore allow mass production.

An H-shaped fluorescent lamp shown in FIG. 3 is formed by welding glass tubes 5, 6 and 7, as shown in FIG. 4. In this manufacturing method, the glass tubes 5, 6 and 7 of different shapes must be prepared, and heating, softening and welding processes of these glass tubes 5, 6 and 7 require many procedures. Therefore, this manufacturing process does not allow mass production.

Meanwhile, in Japanese Patent Publication No. 49-47516, the following manufacturing method of a fluorescent lamp having a U-shaped discharging path is disclosed. A glass bulb having a gourd-shaped cross section, which is similar to the final shape of a fluorescent lamp, is prepared. While a narrowed portion of this glass bulb having a gourd-shaped cross section is heated, an external force is applied thereto. Thus, the narrowed portion is fused, thereby forming the U-shaped discharging path. However, in this method, the glass bulb having a shape similar to the final shape of the fluorescent lamp must be prepared. Therefore, the manufacturing process becomes complex. In addition to this, since only one portion (the narrowed portion) is heated and pressed, the pressed portion has a thickness less than that of other portions, and a U-shaped tube having a good mechanical strength cannot be obtained. Therefore, although this method can be applied in manufacturing a miniature fluorescent lamp having a diameter of several millimeters, it is very difficult to apply this method in manufacturing a fluorescent lamp having a relatively large diameter, e.g., 7 or 10 mm or more.

SUMMARY OF THE INVENTION

The present invention has been made in consideration of this situation and has as its objects to provide a method of manufacturing a fluorescent lamp which is suitable for mass production with a bent discharging path and less variation in thickness of a discharging path wall and to provide a fluorescent lamp having high mechanical strength and good luminous intensity distribution characteristics.

According to the present invention, there is provided a method of manufacturing a fluorescent lamp, comprising the steps of:

heating and softening a straight glass tube; and molding the tube into a bulb having a desired bent discharging path by clamping and pressing said straight glass tube which is softened between a pair of molds having molding surfaces corresponding to the desired bent discharging path, and simultaneously blowing therein a pressurized gas from one end of said straight glass tube.

Furthermore, there is provided a fluorescent lamp characterized in that said fluorescent lamp is made of glass and has a bent discharging path, with two adjacent side surfaces of a glass tube along the bent discharging path being connected by a plate which is formed by welding together glass tube walls forming the bent discharging path therein, and a slit being formed in a portion of said plate at least adjacent to a sealing portion of an opening portion of the bent discharging path.

BRIEF DESCRIPTION OF THE DRAWINGS

FIG. 1 is a front view of a conventional U-shaped fluorescent lamp;

FIGS. 2(A) to 2(C) are views sequentially showing procedures of a manufacturing method of the U-shaped fluorescent lamp of FIG. 1;

FIG. 3 is a front view showing a conventional H-shaped fluorescent lamp;

FIG. 4 is a view for explaining a manufacturing method of the H-shaped fluorescent lamp of FIG. 3; and FIGS. 5 to 20 show an embodiment of the present invention, in which:

FIG. 5 is a perspective view of a glass tube as a starting material,

FIG. 6 is a perspective view showing an open pair of molds having molding surfaces corresponding to a bent discharging path and a glass tube, FIG. 7 is a sectional view showing a molding state of the molds in FIG. 6, FIG. 8 is a plan view of a U-shaped bulb after molding, FIGS. 9 and 10 are respectively sectional views along a line IX—IX and a line X—X of FIG. 8, FIG. 11 is a perspective view showing a flowing method of a phosphor fluid, FIG. 12 is a perspective view showing a baking process of a phosphor substance, FIG. 13 is a plan view showing a method for sealing the U-shaped bulb, FIG. 14 is a sectional view showing a pinch-sealed state of the electrode, FIG. 15 is a front view of a completed U-shaped fluorescent lamp, FIGS. 16 and 17 are views for explaining the difference between luminous intensity distribution characteristics of a fluorescent lamp according to the present invention and a conventional one, FIGS. 18 and 19 are perspective views of a fluorescent lamp according to another embodiment of the present invention, and FIG. 20 is a plan view showing a fluorescent lamp according to still another embodiment of the present invention.

DETAILED DESCRIPTION OF THE PREFERRED EMBODIMENTS

One embodiment of the present invention will be described below with reference to FIGS. 5 to 17.

This embodiment describes the case of a U-shaped fluorescent lamp, and FIGS. 5 to 14 sequentially show the procedures of the manufacturing method thereof.

Figure 5:
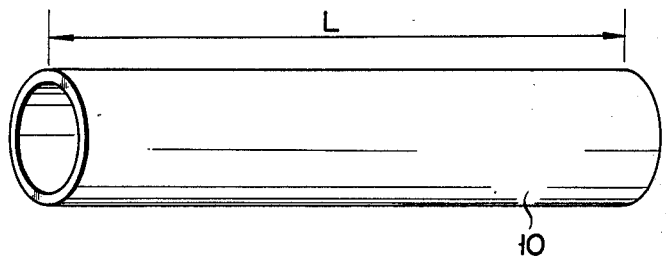
Figure 8:
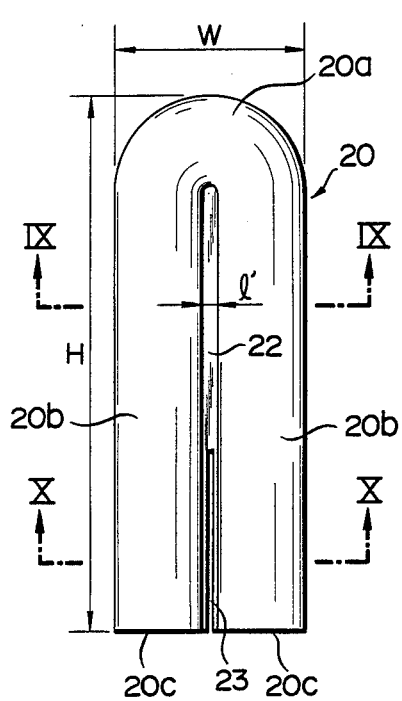

A glass tube 10 shown in FIG. 5 is formed of soft glass such as soda-lime glass and has openings at both ends. Alternatively, one end (i.e., the planned U-shaped end of the U-shaped fluorescent lamp) of the glass tube 10 can be closed, or can be formed into a semispherical shape by heating the tube 10 while rotating it immediately before shaping it in the molds. This glass tube 10 preferably has a length L which is longer than a bulb height H after molding as shown in FIG. 8. An outer diameter of the glass tube 10 is preferably slightly smaller than a maximum width W of a bulb after molding (e.g., about ¾ of the width W).

The inner and outer surfaces of this glass tube 10 are washed. Then, the overall surface of a portion of the glass tube 10 which is to be subjected to pressing is uniformly heated by an oven or burner (neither are shown) in order to soften the glass tube. For softening, the tube 10 can be held at one end by a chuck, suspended, and heated in order to soften the tube (including the other end of the tube).

Figure 6:
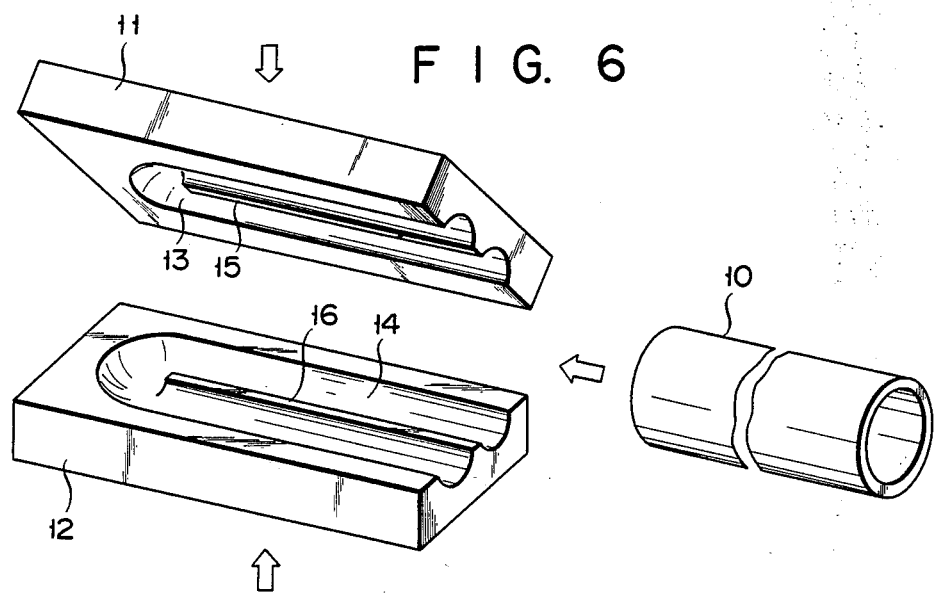

Next, the softened glass tube 10 is properly inserted between the molds 11 and 12 shown in FIG. 6. The softened tube is positioned between these two molds by moving, for example, the molds or the chuck holding the tube. Then, the softened portion is held between the two molds. These molds have recessed molding surfaces 13 and 14 which consist of upper and lower halves of a U-shaped bulb and partition walls 15 and 16. Therefore, when the molds 11 and 12 are closed to match with each other, a space corresponding to a predetermined U-shaped bulb can be formed.

To enable the molds 11 and 12 to be closed as described above with the softened tube interposed therebetween, it is necessary for the entire portion of the tube positioned between the molds to be softened. The overall length of the molds 11 and 12 is shorter than that of the glass tube 10, at least by a portion of the glass tube 10 which is heated and softened. The softened tube 10 is pressed by these molds 11 and 12, and air is blown from an open end of the glass tube 10.

When the two molds are matched, the softened tube 10, except for one end portion, is axially partitioned into two hollow parts communicating with each other along the partition walls 15 and 16 of the molds. To be more specific, the hollow parts are formed along the recessed molding surfaces 13 and 14 of the molds, and a continuous wall is formed along the partition walls 15 and 16. That part of the softened tube 10 which is positioned between edge portions 51 and 52 of the molds is left as burrs, which are removed later. After the matching of the molds, air pressure is applied through the partitioned open ends of the glass tube 10 to permit the softened glass to be pushed against the mold wall so as to eliminate the clearance between the glass tube and the mold wall. In this step, air scarcely flows within the glass tube because it suffices to apply air pressure.

In the case of using a glass tube closed at one end, the softened glass tube is arranged such that the closed end of the tube is positioned at recesses 53, 54 of the molds adjacent to the edge portions 51, 52. The tube should be positioned not to allow the closed end to be caught by the edge portions 51, 52 when the molds 11 and 12 are matched. In this case, burrs are not formed in the molding step. After the matching of the molds, air pressure is applied through the partitioned open ends of the glass tube to permit the softened glass to be pushed against the mold wall so as to eliminate the clearance between the glass tube and the mold wall.

As a result, the glass tube 10 is fitted into the molding surfaces 13 and 14, thereby forming a bulb having one U-shaped discharging path. Thereafter, the portion which is not subjected to molding as well as the miscellaneous burrs are cut off, thereby obtaining a bulb 20 having the U-shaped discharging path, as shown in FIG. 8.

Figure 9:
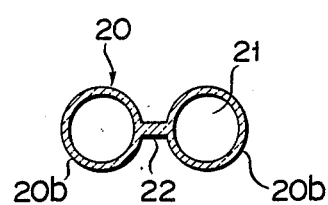

The bulb 20 shown in FIG. 8 has a U-shaped discharging path 21. Straight portions 20b, extending parallel to each other from two ends of a bent portion 20a, are molded to have a small gap l' (e.g., 2 to 3 mm). In addition to this, the gap l' portion has a bridging plate 22 which is formed by being clamped and pressed between the partition walls 15 and 16 when the tube 10 is molded by the molds 11 and 12. In other words, the tube walls of the straight portions 20b in the bulb 20 are connected to each other by the bridging plate 22, as shown in FIG. 9.

Figure 10:
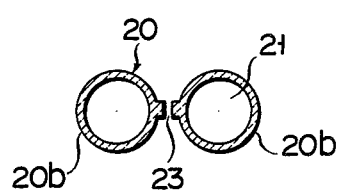

After molding by the molds 11 and 12, a slit 23 as shown in FIG. 8 is formed by a cutting process. A portion in which the slit 23 is formed separates the respective tube walls of the straight portions 20b, as shown in FIG. 10. The length of this slit 23 is not limited, and the slit 23 can be formed only in a portion of the plate 22 adjacent to the mount stem attaching portions of opening portions of the U-shaped bulb 20.

The slit 23 can be formed not only by the cutting process after molding as described above, but also by using the partition walls 15 and 16 which come into contact with each other when the molds 11 and 12 are closed, thereby forming the slit 23 in the molding process.

Figure 11:
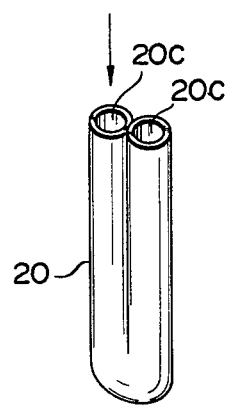
Figure 12:
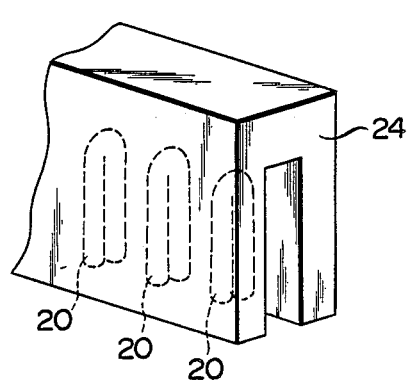
Figure 13:
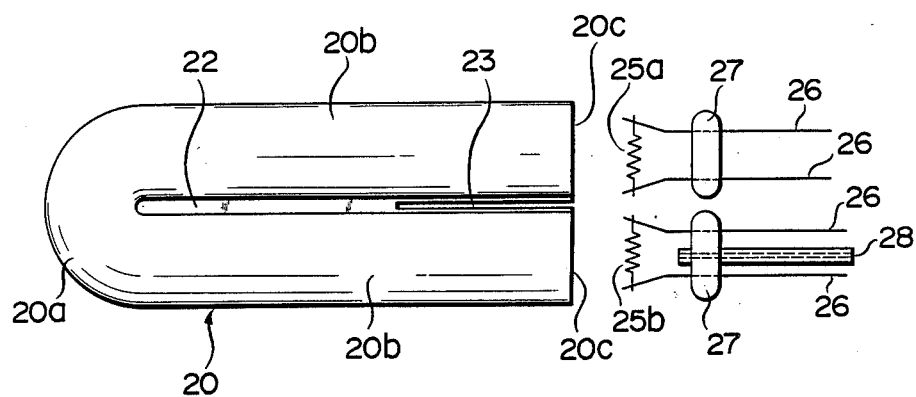
Figure 14:
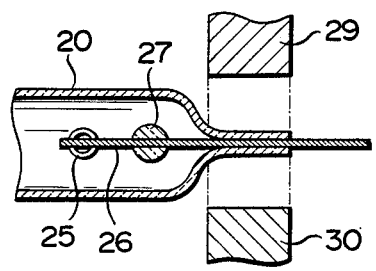

A phosphor fluid is supplied to the thus molded bulb 20, as shown in FIG. 11, and a phosphor coating layer (not shown) is formed on the inner surface of the bulb 20 to a predetermined thickness. The phosphor coating layer is baked by being passed through a baking oven 24 shown in FIG. 12.

Mounts 3 with electrodes are attached to two opening portions 20c of the bulb 20. In this attaching process, the bulb 20 can be sealed. However, in this embodiment, the pinch-seal method is used. In other words, electrodes 25a and 25b are connected to lead wires 26, and each pair of lead wires 26 is held by a bead glass 27. In this case, an exhaust tube 28 is connected to at least one bead glass 27.

Thus prepared mounts with electrodes are respectively inserted in the opening portions 20c. Before or after inserting the mounts, the opening portions 20c are heated and softened. Thereafter, the softened opening portions 20c are pressed by pressing molds 29 and 30, thereby sealing the mounts.

Thereafter, the bulb 20 is exhausted through the exhaust tube 28. Mercury and an inert gas are then enclosed therein, and the exhaust tube 28 is cut. A base 31 is provided to the end portions of the bulb 20, thereby obtaining a U-shaped fluorescent lamp shown in FIG. 15.

According to this manufacturing method, since the bulb 20 shown in FIG. 8 is obtained by being pressed in the molds 11 and 12 of FIG. 6, the process is very easy. In addition to this, since no bending process is required, the overall thickness of the bulb wall can be relatively uniform.

Figure 7:
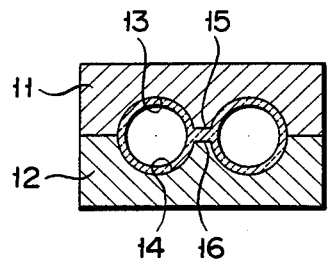

Since the tube walls of the straight portions 20b are connected with each other by the bridging plate 22, the bulb will not be easily damaged even if external force indicated by the arrow of FIG. 1 is applied thereto. As shown in FIG. 7, the bridging plate 22 can be easily molded by the partition walls 15 and 16 of the molds 11 and 12.

The reason the slit 23 is formed in the bridging plate 22 is as follows. In the baking process of the phosphor coating layer or the sealing process of the mounts with electrodes 25a and 25b, the bulb walls also become heated, and in this case, temperature distribution tends to be uneven. If the slit 23 is not formed, it is difficult to soften the bridging plate portion 22, and thermal strain occurs, thereby causing fractures or cracks. However, if the slit 23 is formed, since the tube walls of the straight portions 20b are then separated from each other, such thermal strain is unlikely to occur, thereby minimizing fractures or cracks.

According to the above method, since the phosphor coating layer is formed on the inner surface of the bulb after molding the U-shaped bulb 20, peeling-off of the phosphor substance which occurs in the conventional bending process can be avoided.

The pinch-seal method for attaching the mounts to the bulb 20 and sealing the bulb 20 is highly suitable for mass-production in comparison to the conventional butt-seal method.

Figure 15:
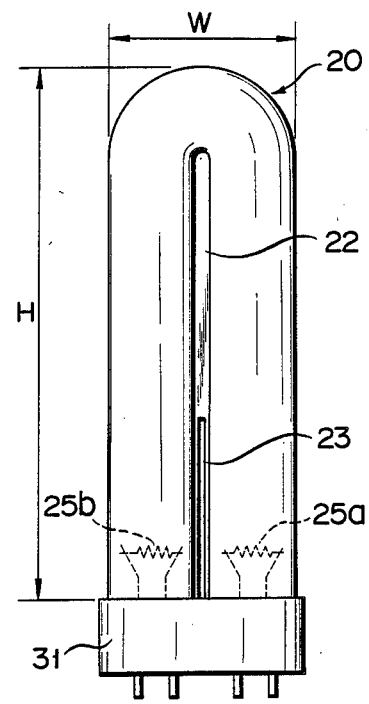
Figure 16:
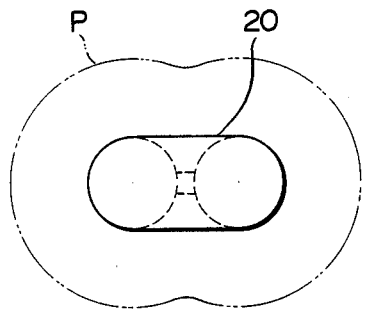

The U-shaped fluorescent lamp shown in FIG. 15, obtained by the method of the present invention, has the following advantages in comparison to a fluorescent lamp manufactured by a conventional method (including bending process).

As described above, the bulb according to the method of the present invention had less variation in wall thickness thereof and has the bridging plate 22, resulting in improved mechanical strength. When the mechanical strengths of the bent portions 20a and 1a of U-shaped fluorescent lamps of a 10 watt type are measured by a drop-weight test, the mechanical strength of the conventional lamp is 22 g-cm and that of the lamp of the present invention is 105 g-cm. These are the results respectively obtained from testing an average of ten lamps in each case. As a result, the mechanical strength of the lamp of the present invention can be improved by about 4.8 times that of the conventional lamp. Note that the drop-weight test is a testing method in which, for example, a steel ball of 2 g is dropped on an object to be tested from a predetermined height, and the height at which the object breaks is measured, thereby determining the mechanical strength of the object.

When characteristics of the lamps were examined, the results as in Table 1 were obtained. In this case, the discharging path lengths of the lamps of the present invention were the same as that of the convention lamps.

TABLE 1

|  | Ratings of lamp | Size H × W × inner diameter of discharging path (mm) | Lamp voltage Volt | Lamp current Ampere | Lamp power Watt | Light output lm | Light efficacy lm/W |
| --- | --- | --- | --- | --- | --- | --- | --- |
| Prior art | 10 watt class | 140 × 42 × 16 | 52 | 0.205 | 9.7 | 205 | 21.1 |
|  | 14 watt class | 180 × 42 × 17.5 | 53 | 0.310 | 13.8 | 810 | 58.7 |
| Present invention | 10 watt class | 144 × 34 × 16 | 53 | 0.200 | 9.8 | 220 | 22.4 |
|  | 14 watt class | 190 × 34 × 16 | 54 | 0.298 | 13.8 | 860 | 62.3 |

Figure 17:
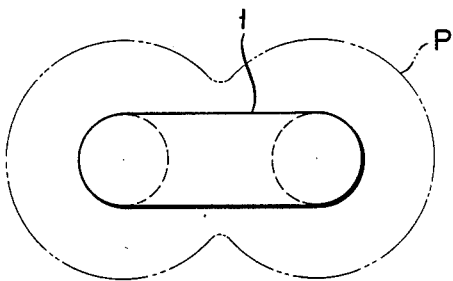

As is apparent from Table 1, although the lamp of the present invention has a small width W, the light efficacy of the lamps of the present invention is almost the same as that of the conventional lamps. The lamp of the present invention has the bridging plate 22 which scatters light outside the lamp by refractive reflection. Since the width W is decreased and the bridging plate 22 discharges the refracted and reflected light, the luminous intensity distribution of the lamp of the present invention has a shape close to a circle as indicated by an alternate long and two short dashed lines P in FIG. 16. Conversely, the luminous intensity distribution of the conventional lamp in FIG. 1 has a spectacle-like shape as shown in FIG. 17. When the luminous intensity distribution characteristics of fluorescent lamps approach a circular-shape, design of such appliances can be simplified and effective usage of light can be enhanced. Table 2 shows the characteristics of fluorescent lamps having other structures manufactured in accordance with the method of the present invention.

TABLE 2

| Size H × W × inner diameter of discharging path (mm) | Lamp voltage Volt | Lamp current Ampere | Lamp power Watt | Light output lm |
| --- | --- | --- | --- | --- |
| 70 × 34 × 12 | 49 | 0.120 | 4 | 115 |
| 90 × 34 × 12 | 54 | 0.140 | 6 | 253 |
| 120 × 34 × 12 | 52 | 0.175 | 8 | 420 |
| 150 × 34 × 12 | 53 | 0.250 | 11 | 510 |

Figure 18:
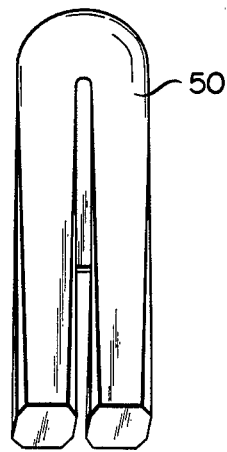
Figure 19:
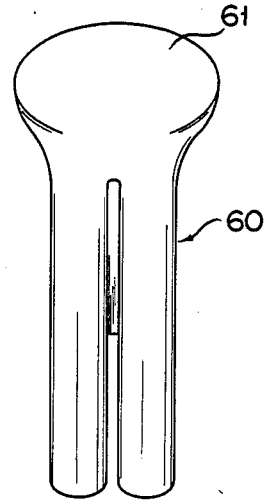

Another advantage of the method of the present invention is the achievement of a desired bulb shape, that is, a desired discharging path. For example, a discharging path of the bulb 50 in FIG. 18 has a polygonal cross-section. Meanwhile, the bulb 60 in FIG. 19 comprises a mushroom-shaped illuminating portion 61 at its bent portion, and is suitable when the illuminating portion 61 is directed toward a surface to be illuminated. The shape of this illuminating portion 6; can be formed into a circular- or polygonal-shape (e.g., a hexagonal shape).

Figure 20:
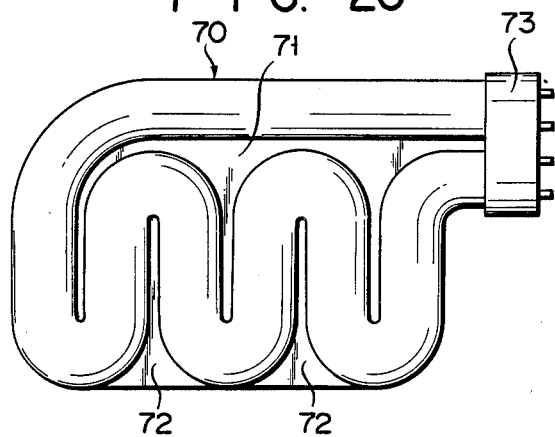

Furthermore, the bulb 70 shown in FIG. 20 comprises an undulating discharge path. In the manner described, a bulb having such a shape can be molded. Note that reference numerals 71 and 72 denote bridging plates; and 73, a base.

According to the present invention, bridging plates are not always needed and can be omitted as needed.

As described above, according to the method of the present invention, a straight glass tube is pressed so as to form a bent discharging path, thereby allowing easy processing and mass production. In addition, variations in thickness of a discharging path wall can be minimized, and the mechanical strength can be improved. Furthermore, a discharging path of a desired shape such as a U-shape, W-shape, meandering shape and other shapes can be easily obtained.

According to the method of the present invention, since a straight glass tube is heated and softened and pressed by molds so as to form a bent discharging path, a relatively large bent fluorescent lamp having a discharging path with an inner diameter of 10 mm or more can be easily manufactured.

A fluorescent lamp manufactured according to the present invention has good physical and optical characteristics, and the occurrence of thermal strain during manufacturing can be minimized by forming a slit between two adjacent portions of a discharging path.

What is claimed is:

1. A manufacturing method of a bulb for a fluorescent lamp comprising the steps of:
   heating and softening a straight glass tube having two ends where at least one of said two ends is open, and
   molding said straight glass tube into a bulb of predetermined shape, having a discharging path with two ends, said molding step including the following steps:
   (i) placing said straight glass tube into a press mold having first and second press mold sides, each of said press mold sides having molding surfaces corresponding to a predetermined shape of said bulb, including opening portions for mounting electrodes,
   (ii) pressing the first and second press mold sides together so as to collapse in a diametrical direction said tube from opposite sides of the tube, and
   (iii) injecting a pressurized gas into said mold to form said bulb by introducing said gas at said open end of said glass tube,
   wherein the pressing step and the injecting step cause the entire outer wall of said tube to be surrounded and deformed by said press mold and cause a bridging portion connecting adjacent sides of said discharge path to be formed.

2. A method according to claim 1, wherein said straight glass tube has openings at two ends thereof.

3. A method according to claim 2, further including a step of preshaping said glass tube during said heating and softening step whereby one of said open ends is first closed.

4. The method according to claim 1, further comprising a slit forming step subsequent to said molding step wherein a slit is formed by cutting part of said bridging portion.

5. The method according to claim 1, wherein said molding step utilizes said first press mold side having a first partition wall and said second press mold side having a second partition wall wherein the partition walls come in contact during said pressing step to form a slit proximate to said ends of said bulb.

6. The method according to claim 4, wherein said slit is formed in said bridging portion proximate to said ends of said bulb.

* * * * *